ated Apr. 5, 1955

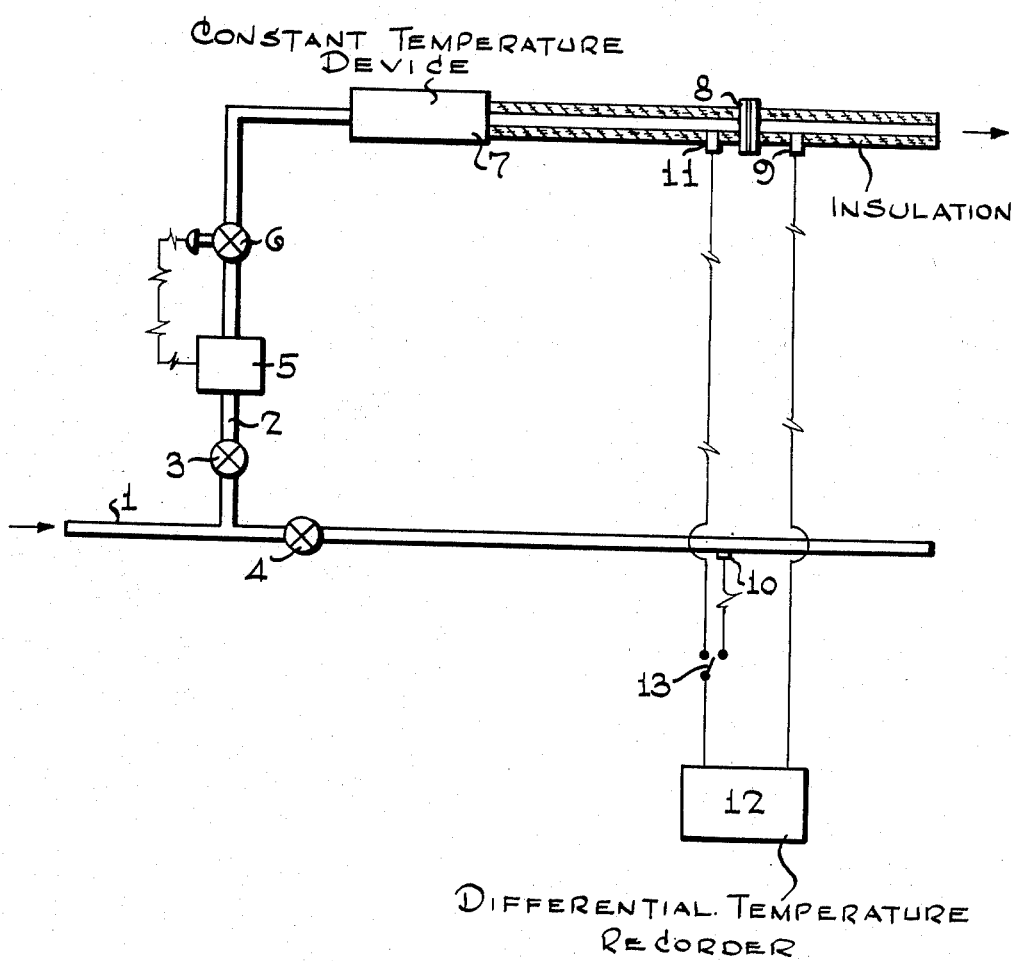

2,705,420

METHOD FOR CONTINUOUS TRUE VAPOR PRESSURE DETERMINATIONS

John L. Bryan, Jr., Edwin F. Curry, and Charles A. Rivet, Jr., Baton Rouge, La., assignors to Esso Research and Engineering Company, a corporation of Delaware Application May 29, 1952, Serial No. 290,736

1 Claim. (Cl. 73—53)

This invention concerns a novel technique for the continuous measurement of vapor pressures. It is the purpose of this invention to provide a convenient and effective manner of continuously determining the vapor pressure of a liquid flowing through a conduit. In accordance with this invention, vapor pressure is determined by heating a sample of the liquid stream to a constant temperature at a constant pressure, and to thereafter sharply reduce the pressure on the liquid to cause at least some vaporization. The resulting temperature drop is correlated directly with Reid vapor pressure.

For many years the trend in chemical processing and petroleum refining operations has been to provide continuous processes to replace virtually any and all batch processes formerly employed. As a result it has become important to provide suitable chemical and physical control instruments so as to permit satisfactory process control on a continuous basis. Thus, in the conduct of continuous processes involving high rates of fluid flow which may be subject to rapid changes in composition, a real problem is imposed in providing suitable instrumentation and control apparatus.

An example of this problem concerns the determination of the vapor pressure of a liquid flowing through a processing conduit. Specifically, for example, in the production of gasoline, a critical inspection of the gasoline concerns the vapor pressure of the final product. The present invention is concerned with a simple and effective manner of continuously determining the vapor pressure of a product such as gasoline to meet the need described.

The method of this invention utilizes the principle that the Reid vapor pressure (V. P. @ 100° F., by the Reid method) of a liquid is proportional to the temperature drop occurring on flashing of the liquid across an orifice under controlled and constant conditions. When a liquid is heated to a temperature above its normal boiling point and maintained at a pressure sufficient to hold it in liquid phase, vaporization will occur when the pressure is sharply dropped. This vaporization achieved by sharply dropping the pressure at which a liquid is maintained is called "flashing." Flashing is accompanied by a temperature drop due to the formation of vapors. Consequently, it is possible by temperature measurements to determine the proportion of a liquid which is vaporized in a flashing operation.

The present invention employs this principle of flashing a liquid to achieve substantial vaporization of the liquid in order to determine vapor pressure. In order that the temperature measurements may be precisely correlated to the vapor pressure of the liquid it is necessary that the flashing occur at constant and fixed conditions. Thus, the liquid to be flashed just prior to flashing must in every case have the same initial temperature. Again the liquid just prior to flashing must be at a sufficient pressure to hold it in liquid phase. When these requirements are fulfilled, the drop in temperature occurring across an orifice or other pressure dropping means can be precisely correlated with the Reid vapor pressure of the liquid.

The accompanying drawing diagrammatically illustrates a preferred form of the method and apparatus of this invention. In this drawing a processing conduit 1 is illustrated through which a liquid stream of reactants, intermediate products, or products may flow. In order to determine the Reid vapor pressure characteristics of liquid flowing through conduit 1, a portion of the liquid is continuously withdrawn through the branch conduit 2. The quantity of the portion of the stream withdrawn for sampling is not critical and can be quite small. Sample stream flow rates of about 1 to 10 gallons per hour are entirely adequate, for example. Valves 3 and 4 positioned in the main and branch conduits may be set to withdraw a desired portion of the liquid for sampling purposes. As will be apparent, sampling can be achieved regardless of the pressure existent in the main liquid conduit.

The sample of liquid flowing in the branch conduit 2 is first passed through a pressure control device 5 adapted to regulate the pressure of the sampled liquid passing through. By way of example, a suitable constant pressure device for application in this invention may constitute an electrically controlled solenoid check valve 6, the operation of which is regulated by a pressure sensing element 5. Thus, conventional apparatus may be employed to develop an electrical signal proportional to the pressure in the line, and this electrical signal may be employed to control operation of check valve 6, permitting sufficient passage of liquid to maintain the liquid under a predetermined and constant pressure. It may be observed that pressure prior to flashing of the liquid stream is not particularly critical. Provided that the pressure is maintained at a chosen value within about 10 p. s. i., plus or minus, accurate vapor pressure determinations may be made. Consequently, in many applications where the pressure and flow rate of liquid in the conduit to be sampled are reasonably constant, suitable pressure control of the sample stream may be established by the setting of valves 3 and 4.

It is apparent that a variety of methods and apparatus may be adopted to suitably maintain the sampled liquid at a constant pressure. Thus, for example, in certain systems, it is possible to maintain a constant pressure on the sampled liquid by employing a liquid leg through which the liquid may flow with provision for overflow of excess liquid. This or other expedients may be used in the practice of this invention to provide a sample of the liquid at a constant head or pressure.

The liquid at a constant pressure is then passed through a temperature control device 7. The temperature control device is of a character to regulate the temperature of the liquid so that the liquid leaving the device is continuously at a constant and predetermined temperature level. In many applications the constant temperature device 7 will constitute a heat exchanger or heating means regulated by thermostats or the like. Thus, for example, the constant temperature device 7 may constitute a long length of conduit provided with electrical heaters and control thermostats. In other applications of the invention, particularly where the main liquid line is maintained at a very high temperature, the constant temperature device 7 may constitute a cooling coil effective to cool the liquid to a predetermined temperature level.

As will be understood, the nature of the constant temperature device 7 and constant pressure device 5 is determined primarily by the liquid whose vapor pressure is to be determined. It is necessary that pressure be sufficient to maintain liquid phase prior to flashing. It is necessary that the temperature of the liquid be adjusted so as to permit substantial vaporization of the liquid when the pressure is sharply reduced. In the case of water, for example, the constant temperature device may preferably be employed to heat the water to any temperature above its normal boiling point. In this case any predetermined and constant pressure may be employed which is sufficient to maintain liquid phase. In the case of gasoline, for example, a lower temperature may be employed. Thus, for a gasoline a temperature as low as 160° F. may be used.

Consequently, after passage through the constant pressure and constant temperature regulator, the sample liquid is subjected to a sharp pressure drop, decreasing the pressure of the liquid sufficiently to result in boiling of the liquid. This may be achieved by means of a suitable valve, orifice, enlarged chamber, or the like. It is only necessary that the pressure imposed on the liquid be dropped sufficiently to secure vaporization of at least a portion of the liquid. It is particularly preferred that the means for dropping pressure constitute an orifice 8. The downstream side of the orifice may be vented to the atmosphere where superatmospheric pressures are imposed on the liquid supplied to the orifice. Alternatively, the downstream side of the orifice may be connected to an aspirator, a barometric leg, or other means to impose a vacuum on the system. By this means, liquid passed through the pressure dropping means under the conditions set forth, is caused to vaporize in a manner causing at least some drop in the temperature of the fluid.

For accurate vapor pressure determinations, it is essential that the liquid is dropped in pressure to a fixed and constant value. While, as stated, pressure prior to flashing is not particularly critical, the pressure after flashing must be closely controlled. This may be simply and effectively accomplished if the liquid is flashed to atmospheric pressure, as by venting orifice 8 to the atmosphere. It is for this reason that in the preferred practice of this invention the liquid is maintained at superatmospheric pressure, above its normal boiling point prior to flashing to permit flashing at atmospheric pressure.

In order to determine Reid vapor pressure characteristics of the liquid, a temperature sensing element 9 is positioned in the branch conduit adjacent and downstream to the orifice 8 or other pressure dropping apparatus. Reid vapor pressure determinations can be obtained by reference to this temperature alone. Thus, since liquid is supplied to the orifice at a constant temperature, the temperature after flashing, determined by element 9, will be directly proportional to the Reid vapor pressure characteristics of the liquid. However, if information is also desired as to the true liquid vapor pressure of the liquid flowing through the main conduit 1, then it is necessary to also determine the temperature of the liquid in this conduit, as by means of temperature sensing device 10. In this case, the differential temperature determined by elements 9 and 10 may be directly correlated to the actual vapor pressure of liquid in line 1 at the temperature there existing. For example, at constant composition ($T_9$ constant), an increase in stream temperature ($T_{10}$) will cause a decrease in $\Delta T(T_9-T_{10})$. This change in $\Delta T$ is directly proportional to the increase in true liquid vapor pressure resulting from the higher stream temperature. At constant stream temperature an increase in R. V. P. of the stream will lower $T_9$ and thereby cause a decrease in $\Delta T$. This change in $\Delta T$ is likewise directly proportional to the increase in the standard vapor pressure (or absolute V. P. since temperature is unchanged) of the stream.

A preferred method of employing these principles is illustrated in the drawings in which the temperature sensing elements 9 and 10 are positioned in the branch conduit and principal conduit as described. In addition, a third temperature sensing element 11 is preferably positioned upstream of the orifice 8. By using a differential temperature recorder 12 and a switch 13, it becomes possible to measure the Reid vapor pressure characteristics of the liquid and/or the actual vapor pressure of the liquid in the main conduit. Thus, when switch 13 is connected to determine the temperature difference at points 9 and 11 across the orifice, the temperature difference exhibited by recorder 12 will be proportional to the Reid vapor pressure of the liquid. However, when switch 13 is actuated to determine the temperature difference between points 9 and 10, the temperature difference obtained will be proportional to the actual vapor pressure of the liquid at the temperature in the main conduit.

In employing this invention it is particularly preferred that the constant temperature regulator employed heat the liquid to be tested to a temperature substanially above the normal boiling point of the liquid. Sufficient superatmospheric pressure is then applied to maintain this heated liquid in liquid condition. Consequently, by simply flashing this liquid to atmospheric pressure the necessary cooling and temperature determinations may be obtained.

The conditions of temperature and pressure imposed should be adjusted to permit vaporizing a substantial portion of the liquid when flashed. Thus, the precision of vapor pressure determinations is related to the amount of liquid flashed and the consequent drop in temperature achieved. Thus, it is ordinarily preferred that at least about 10 to 25% of the liquid is vaporized in the flashing operation.

As an example of the process and utility of this invention, a gasoline having a Reid vapor pressure of 6 p. s. i. absolute was flashed across an orifice to secure differing proportions of vaporization. In a first experiment, the gasoline was heated to a temperature of 160° F. and maintained at a pressure of 30 p. s. i. g. This gasoline was passed through an orifice, dropping the pressure to atmospheric pressure, resulting in a temperature drop across the orifice of about 2° F. In subsequent experiments it was determined that other lighter gasoline fractions or constituents having Reid vapor pressures of 10 and 12 p. s. i. absolute resulted in temperature drops of about 12° and 23° F., respectively, when flashed in the same manner. It is therefore to be seen that the Reid vapor pressure characteristics of a liquid may be correlated to the temperature drop occurring across an orifice.

In another series of experiments, petroleum products having varying volatilities were flashed across an orifice under constant conditions of temperature and pressure. In this case the temperature was determined downstream of the orifice and in the main conduit from which the liquid was obtained. Again, it was found that this temperature difference could be correlated precisely to the true liquid vapor pressure of the liquid.

What is claimed is:

A method for determining the actual vapor pressure characteristic of a liquid material flowing through a conduit therefor, comprising withdrawing a portion of said material from said conduit, passing said withdrawn portion through a separate confined flow path therefor, heating said withdrawn portion during passage through said flow path to a temperature above the normal boiling point of said liquid material, imposing a superatmospheric pressure on said withdrawn portion in said confined flow path such as to maintain said portion in a liquid phase at the temperature to which it has been heated, discharging said withdrawn portion from said confined flow path into a zone of substantially constant pressure which pressure is substantially below the pressure obtaining in said flow path, and below that at which said material will vaporize when at the temperature obtaining in said flow path, vaporizing at least a portion of said withdrawn portion of said liquid material in said zone, producing a temperature differential between the liquid material in said confined flow path and the vaporized material in said zone, electrically sensing the temperature of the vaporized material in said zone of lower pressure, electrically sensing the temperature of the liquid material flowing through said conduit, and determining the true vapor pressure of said liquid material flowing through said conduit as a function of the difference between the sensed temperature of said liquid material after vaporization and the sensed temperature of said liquid material flowing through said conduit.

References Cited in the file of this patent

UNITED STATES PATENTS

| | | |
|---|---|---|
| 1,945,660 | Scott | Feb. 6, 1934 |
| 2,002,101 | Valby | May 21, 1935 |
| 2,566,307 | Boyle | Sept. 4, 1951 |
| 2,571,470 | Milligan | Oct. 16, 1951 |
| 2,671,342 | Kapff | Mar. 9, 1954 |